July 31, 1956  R. E. GREENOUGH  2,756,608
SELF-SEALING DIRT RELIEF MEANS FOR BALL SCREWS
Filed July 27, 1954
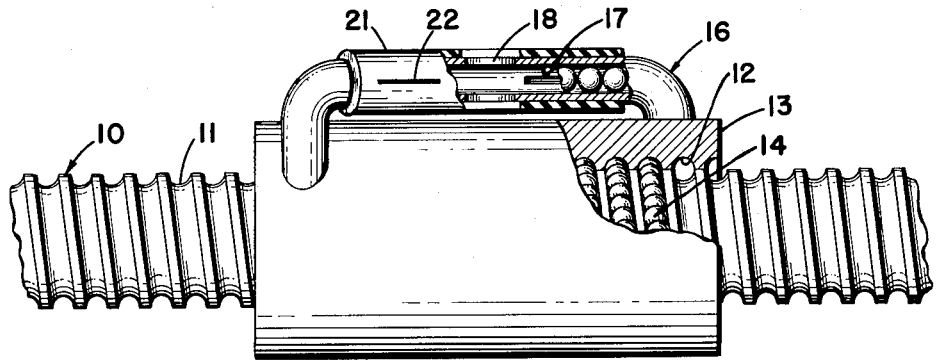
FIG. 1
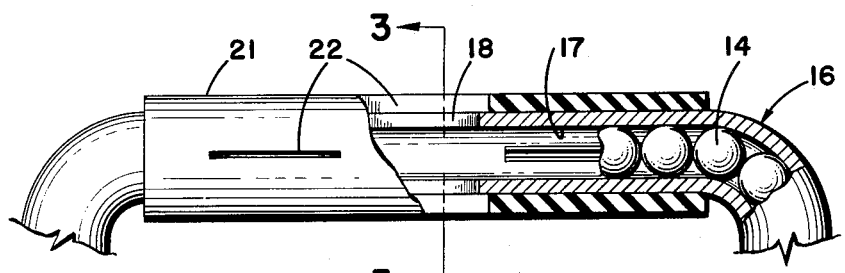
FIG. 2
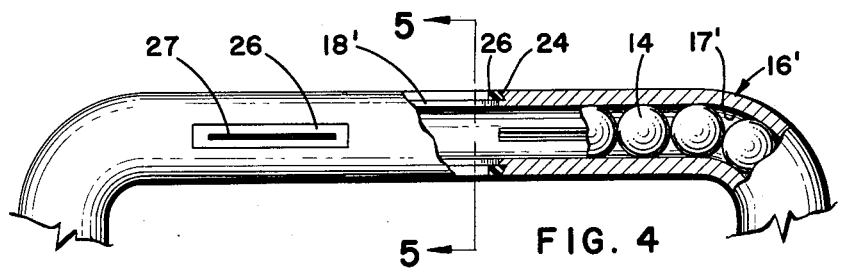
FIG. 4
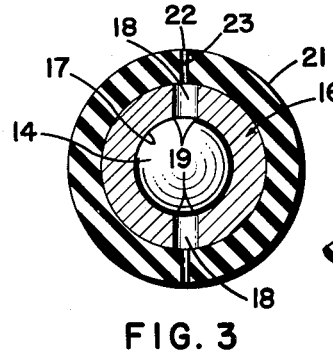
FIG. 3
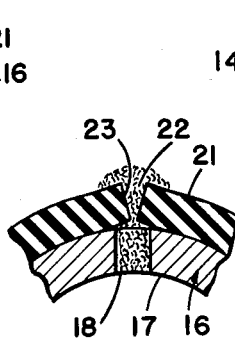
FIG. 6
FIG. 5
INVENTOR.
RAYMOND E. GREENOUGH
BY
*ATTORNEY*

United States Patent Office 2,756,608
Patented July 31, 1956

2,756,608

SELF-SEALING DIRT RELIEF MEANS FOR BALL SCREWS

Raymond E. Greenough, Berea, Ohio, assignor to The Cleveland Pneumatic Tool Company, Cleveland, Ohio, a corporation of Ohio Application July 27, 1954, Serial No. 445,977

8 Claims. (Cl. 74—459)

This invention relates to ball screws in general and more particularly to a means for removing foreign matter from the ball passages thereof.

Those skilled in the art will recognize that in ball screws the balls must be free to roll in a frictionless manner in order to provide proper operation of the device. Any dirt or foreign matter which collects in the ball screw will hamper this frictionless rolling operation and reduce the overall efficiency of the device to the point where complete failure may occur.

It is an important object of this invention to provide a device which incorporates a self-sealing means for automatically eliminating dirt and other foreign matter from a ball screw.

It is still another object of this invention to provide in combination a screw, nut and return tube for ball screws wherein the return tube is provided with self-sealing dirt relief means which permits dirt to pass out of the return tube.

It is still another object of this invention to provide a return tube for ball screws wherein the return tube incorporates self-sealing means to clean the balls as they pass through the return tube and wherein the dirt cleaned from the balls may pass out through the walls of the tube.

Further objects and advantages will appear from the following description and drawings, wherein:

Figure 1 is a side elevation partially in longitudinal section showing a ball screw incorporating a return tube according to this invention;

Figure 2 is an enlarged side elevation partially in longitudinal section showing a return tube incorporating this invention;

Figure 3 is a cross section taken along 3—3 of Figure 2;

Figure 4 is a side elevation of a return tube incorporating another embodiment of this invention;

Figure 5 is a cross section taken along 5—5 of Figure 4; and,

Figure 6 is a fragmentary cross section of a device according to this invention illustrating how dirt and other foreign matter is relieved from the return tube.

A ball screw incorporating this invention a screw formed with external spiral grooves and a nut formed with internal spiral grooves complementary with the grooves in the screw. The grooves in the screw and the nut cooperate to form a spiral channel of substantially circular cross section in which the balls are located. A return tube is mounted on the nut to provide a return passage for conveying the balls from one end of the nut to the other thereby forming a closed circuit for the balls. The return tube is formed with a plurality of longitudinally extending slots which extend through the walls of the tube and provide a passage through which dirt and other foreign matter may be discharged. Around the tube is located a rubber-like member formed with slits aligned with the slots in the return tube so that dirt may pass out through the slots in the return tube and on through the slits in the tubular member. The rubber-like member is formed so that the walls of the slits are resiliently engaged and may be deflected apart to permit the passage of foreign matter from the return tube; however, the member functions to seal the return tube and prevent foreign matter from passing from the surroundings into the tube.

For a clear understanding of this invention, reference should be made to the drawings wherein a screw 10 is formed with external spiral grooves 11 which cooperate with internal spiral grooves 12 of a nut 13 to form a spiral channel filled with balls 14. Mounted on the nut 13 is a return tube 16 which provides a ball passage 17 adapted to convey the balls from one end of the nut to the other thereby forming a closed circuit for the balls.

The return tube 16 is formed with a plurality of longitudinally extending slots 18 which terminate at their inner extent in scraping edge 19. These scraping edges 19 engage the surface of the balls as the balls pass through the return tube and serve to remove foreign matter and dirt therefrom which is deposited in the slots 18. Since the balls pass through the spiral channel and the return tube, dirt in the spiral channel tends to collect on the balls and be transported into the return tube where it is removed by the edges 19.

In the embodiment of this invention shown in Figures 1 through 3, a tubular member 21 is fitted around the central portion of the return tube 16 in such a manner that it covers the slots 18. The tubular member 21 is preferably formed of rubber or similar elastic material and is provided with longitudinally extending slits 22 which are aligned with the slots 18. The tubular member is formed so that the walls 23 of the slits 22 are resiliently urged into engagement, thereby normally closing the slots 18. However, since the tubular member 21 is formed of rubber-like material, dirt and foreign matter accumulated in the slots 18 can urge the slits open and pass out through the slits as shown in Figure 6. This release of the dirt is made possible because the passage of the balls through the return tube tends to pack the dirt into the slots and urge it radially out through the slits 22.

The outside of the tubular member 21 is unsupported so the only resistance to the opening of the slits 22 when they are urged radially outward by foreign matter in the slots is the resiliency of the tubular member itself. Conversely the tubular member is supported against inward radial deflection by the walls of the tube 16 so it is effectively impossible for foreign matter to penetrate the slots from the outside. It is apparent, therefore, that the tubular member 21 automatically seals the return tube while offering only slight resistance to the elimination of foreign matter from the tube.

It is apparent that a return tube which incorporates this invention provides means for automatically cleaning the balls as they pass through the tube and also provides means for allowing the dirt thus removed to pass out of the tube.

In the embodiment shown in Figures 4 and 5, the radial outer parts of the slots 18' in the tube 16' form dovetail grooves 24 in which are fitted rubber-like inserts 26. These inserts are provided with slits 27, which serve the same function in the same manner as the slits 22 of tubular member 21.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A self-sealing dirt relief for ball screws comprising a return tube formed with a passage adapted to receive and convey balls, said return tube being formed with an opening through the wall thereof, and a member of rubber-like material mounted on said tube formed with an opening in alignment with said tube opening permitting foreign matter to pass out therethrough, the opening of said member being normally closed by virtue of the resiliency of said material thereby preventing foreign matter from passing into said tube.

2. A self-sealing dirt relief for ball screws comprising a return tube formed with a passage adapted to receive and convey balls, said tube being formed with an opening through the wall thereof, and a member of rubber-like material mounted on said tube and supported against only inward radial deflection thereby, said member being formed with a slit in alignment with said tube opening, said slit being normally closed by virtue of the resiliency of said material.

3. A self-sealing dirt relief for ball screws comprising a return tube formed with a passage of circular cross section adapted to receive and convey balls, said return tube being formed with longitudinally extending radial slots through the wall thereof, and a tubular member of rubber-like material mounted on said tube and formed with longitudinal slits in alignment with said slots permitting foreign matter to pass out therethrough, said slits being normally closed by virtue of the resiliency of said material thereby preventing foreign matter from passing into said slots and tube.

4. A ball screw comprising a screw formed with external spiral grooves, a nut formed with internal spiral grooves complementary with the grooves in said screw, said grooves cooperating to form a spiral channel, balls in said spiral channel engaging and rolling along the walls of said grooves upon relative rotation between said nut and screw, a return tube mounted on said nut formed with a return passage of circular cross section adapted to receive and convey said balls between the ends of said nut, said return tube being formed with an opening through the wall thereof, and relief means covering said opening permitting foreign matter to pass out therethrough, said relief means preventing foreign matter from passing into said opening and tube.

5. A ball screw comprising a screw formed with external spiral grooves, a nut formed with internal spiral grooves complementary with the grooves in said screw, said grooves cooperating to form a spiral channel of substantially circular cross section, balls in said spiral channel engaging in rolling along the walls of said grooves upon relative rotation of said screw and nut, a return tube mounted on said nut formed with a return passage of circular cross section adapted to receive and convey said balls between the ends of said nut; said return tube being formed with longitudinally extending radial slots through the wall thereof, and a member of rubber-like material covering said slots formed with longitudinal slits in alignment with said slots permitting foreign matter to pass out through said slots, said slits being normally closed by virtue of the resiliency of said material thereby preventing foreign matter from passing into said slots and tube.

6. A ball screw comprising a screw formed with external spiral grooves, a nut formed with internal spiral grooves complementary with the grooves in said screw, said grooves cooperating to form a spiral channel, balls in said spiral channel engaging in rolling along the walls of said grooves upon relative rotation between said nut and screw, a return tube mounted on said nut formed with a return passage of circular cross section adapted to receive and convey said balls between the ends of said nut, said tube being formed with an opening through the wall thereof, and a member of rubber-like material mounted on said tube and supported against only inward radial deflection thereby, said member being formed with an opening in alignment with said tube opening, the opening of said member being normally closed by virtue of the resiliency of said material.

7. In a return tube for a ball screw nut adapted to convey balls from one end of the nut to the other, a dirt relief opening through the wall of said tube, and resilient means on said tube normally closing said opening to prevent foreign matter from passing into said tube but capable of flexing to enable foreign matter to pass from said tube through said opening.

8. In a return tube for a ball screw nut adapted to convey balls from one end of the nut to the other, a dirt relief opening through the wall of said tube enabling the passing of foreign matter from the interior to the exterior of said tube, and one way check means for said opening preventing the passing of foreign matter from the exterior into the interior of said tube.

No references cited.